United States Patent
Teng et al.

(10) Patent No.: US 11,152,167 B2
(45) Date of Patent: Oct. 19, 2021

(54) RECONFIGURABLE CONTROL DEVICE

(71) Applicant: Continental Automotive GmbH, Hannover (DE)

(72) Inventors: Ling Chih Teng, Singapore (SG); Jason Choon Leng Tan, Singapore (SG)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 11 days.

(21) Appl. No.: 16/328,018

(22) PCT Filed: Sep. 1, 2016

(86) PCT No.: PCT/EP2016/070573
§ 371 (c)(1),
(2) Date: Feb. 25, 2019

(87) PCT Pub. No.: WO2018/041349
PCT Pub. Date: Mar. 8, 2018

(65) Prior Publication Data
US 2019/0198269 A1    Jun. 27, 2019

(51) Int. Cl.
*H01H 13/7065*   (2006.01)
*B60K 35/00*   (2006.01)
(Continued)

(52) U.S. Cl.
CPC ......... *H01H 13/7065* (2013.01); *B60K 35/00* (2013.01); *B60K 37/06* (2013.01);
(Continued)

(58) Field of Classification Search
CPC ....... H01H 2219/012; H01H 2231/022; H01H 13/83; H01H 2215/008; H01H 2219/039;
(Continued)

(56) References Cited

U.S. PATENT DOCUMENTS

| 4,731,769 A | 3/1988 | Schaefer et al. |
| 6,498,614 B1 | 12/2002 | Amari et al. |

(Continued)

FOREIGN PATENT DOCUMENTS

| DE | 3514438 C1 | 9/1986 |
| DE | 4426669 A1 | 3/1995 |

(Continued)

OTHER PUBLICATIONS

International Search Report and Written Opinion for International Application No. PCT/EP2016/070573, dated Dec. 22, 2016—10 pages.

*Primary Examiner* — Ahmed M Saeed
(74) *Attorney, Agent, or Firm* — RatnerPrestia

(57) ABSTRACT

A reconfigurable control device, in particular for use in a vehicle. Input keys on the reconfigurable control device allow a user to trigger different selection of modes. The control device is reconfigured by performing a first step of selecting a function mode by pressing one of the at least two input keys on the control device and a second step of selecting a function displayed on an array of mechanical switches. The selection of functions is refreshed with user trigger a fresh selection of mode.

10 Claims, 6 Drawing Sheets

(51) Int. Cl.
*H01H 13/83* (2006.01)
*B60K 37/06* (2006.01)
*G06F 3/023* (2006.01)

(52) U.S. Cl.
CPC ........... *G06F 3/0238* (2013.01); *H01H 13/83* (2013.01); *B60K 2370/122* (2019.05); *B60K 2370/139* (2019.05); *B60K 2370/152* (2019.05); *H01H 2221/05* (2013.01); *H01H 2223/0345* (2013.01); *H01H 2233/04* (2013.01); *H01H 2237/006* (2013.01)

(58) Field of Classification Search
CPC ........... H01H 2219/062; H01H 13/702; H01H 13/7057; H01H 2003/0293; H01H 2205/016; H01H 2217/032; H01H 2219/05; H01H 2219/06; H01H 2219/064; H01H 2221/07; H01H 2221/074; H01H 2223/034; H01H 2223/036; H01H 2227/026; H01H 2239/006; H01H 2239/074; H01H 3/125; H01H 13/705; H01H 13/14; H01H 13/70; H01H 13/704; H01H 13/7065; H01H 13/7006; H01H 13/78; H01H 13/79; H01H 13/52; H01H 13/703; H01H 13/507

See application file for complete search history.

(56) References Cited

U.S. PATENT DOCUMENTS

| | | |
|---|---|---|
| 2001/0050671 A1 | 12/2001 | Ogawa et al. |
| 2004/0186639 A1 | 9/2004 | Car |
| 2007/0029172 A1 | 2/2007 | Choi et al. |
| 2008/0259037 A1* | 10/2008 | Kim .................. G06F 3/0202 345/168 |
| 2013/0229339 A1* | 9/2013 | Takahata ............. G06F 3/016 345/156 |

FOREIGN PATENT DOCUMENTS

| | | |
|---|---|---|
| DE | 19962778 A1 | 6/2000 |
| DE | 102008024849 A1 | 12/2008 |
| JP | 09198176 A | 7/1997 |

* cited by examiner

RECONFIGURABLE CONTROL DEVICE

CROSS REFERENCE TO RELATED APPLICATIONS

This application is the U.S. National Phase Application of PCT International Application No. PCT/EP2016/070573, filed Sep. 1, 2016, the contents of such application being incorporated, by reference herein.

FIELD OF THE INVENTION

This invention relates to a control device for use in vehicles. Specifically, mechanical switches or buttons which are reconfigurable, according to a user's input.

BACKGROUND OF THE INVENTION

Within a motor vehicle's interior, for instance the interior of a passenger car, there will be many instruments offering a selection of features or functions. Such functions may include air-conditioner, heater and media. These instruments are usually operated by activating a dedicated input on a control panel within the interior of the motor vehicle. The control panel is usually located around the dashboard area. As technology advances, more features or functions are provided within the motor vehicle interior, to enhance users' experience. This leads to cars having to accommodate a bigger control panel or control panel clustered with several buttons to execute the different functions on a single control panel.

Some disadvantages of using either type of control panels may include inefficient usage of space within the interior of a car due to inferior design or even an increase in costs. An example of a known solution for overcoming the above discussed problem is using a touch screen panel. However, a touch screen interface is usually expensive. In addition, a touch screen interface does not provide a tactile or haptic feedback as does a mechanical button, thereby the user will not receive immediate response to confirm if a command has been executed.

Another known solution to overcome the above discussed problem is the use of a selection of capacitive buttons at the sides of a display. The driver or user is required to press the button to operate the desired functions. This can be confusing for the driver or user, and risk jeopardising the safety of the driver as the driver may have to stretch his or her arm to reach out to soft buttons on the other end of the control panel (away from the driver's seat), taking his or her eyes off the road for a longer period of time.

DE 102008024849 A1, incorporated herein by reference, with a date of filing of 23 May 2008 discloses an electrical switching arrangement for trigger the different functions in a motor vehicle. DE 102008024849 A1 discloses a switching arrangement that provides a display to represent the function symbols.

DE 19972778 A1, incorporated herein by reference, with a date of filing of 23 Dec. 1999 discloses a display screen switches with improved readability. This is achieved by shortening the distance between the display screen of a touch screen panel to the top of touch screen button.

DE 4426669 A1, incorporated herein by reference, with a date of filing of 28 Jul. 1994 discloses a control panel using light guiding to reproduce information of function symbols from a display onto input buttons shown on the surface of a control panel.

US 2004186639 A1, incorporated herein by reference, with a date of filing of 21 Mar. 2003 discloses a programmable switch display unit for controlling vehicle operations in heavy duty road truck. US 2004186639 A1 teaches the implementation of multiple control functions on a single display to overcome overcrowding and complexity of wiring in the dashboard area.

None of the above references teaches methods of reconfiguring function symbols of a control device for use in vehicles to provide a design that reduces the number of buttons required on the control device and reduction of material costs. Further, none of the above inventions take into consideration of the potential safety hazards involve should the driver's focus is kept off the road for too long when operating instruments within the car interior.

Therefore, there is a need for a more cost efficient, control device for use in vehicles that addresses the above problems.

SUMMARY OF THE INVENTION

An aspect of the invention is a simple and cost efficient reconfigurable control device which can cover many functions for use in a vehicle, to solve the above discussed problems.

To accomplish this and other aspects of this invention, there is provided a reconfigurable control device for use in vehicles, comprising a display means for supplying text and/or graphical information, an array of mechanical switches having an opaque portion and a housing unit. The surface of the housing unit further comprising a display opening for viewing a second section of the display means, a recess for receiving the array of mechanical switches, and at least two outlets, each of the at least two outlets for retaining at least one input key. An electronic control unit is provided for retrieving information from the array of mechanical switches and the input keys, e.g. when the electronic control unit is in communication with the array of mechanical switches and/or the at least one input key. The at least one input key is configured for selecting a plurality of predetermined modes, and the array of mechanical switches are each configured for supplying a plurality of predetermined functions. The array of mechanical switches covers partially the first section of the display means and the electronic control unit.

An aspect of the invention is based on the idea to use hardware buttons and switches wherein a plurality of switches are reconfigurable with regard to their definition and display of functions. One of the advantages of an aspect of this invention is the reduction of number of hardware buttons or switches used on the control device, while offering different function modes to operate the instruments within the interior of a vehicle. Since minimal number of hardware components are reutilised for different functions depending on the respective mode, it is user friendly and ultimately reduces material cost. Furthermore, the arrangement and design of the mechanical switches are made in that way in order to accomplish said advantages with just one display and one electronic control unit in a compact manner.

The control device enables to input a selection from a plurality of predetermined modes, such as climate mode or media mode, and upon selecting a predetermined mode, another selection based upon a plurality of predetermined functions displayed on a section or part of a display means can be entered. The plurality of predetermined functions is represented by an array or series of transparent or opaque buttons or switches, thereby allowing the user to see icons and/or text representing the different functions.

By way of example, the climate mode is selected. All the predetermined functions in relation to climate mode, for instance controls for increasing and decreasing temperature, controls for front and rear air conditioners and/or heaters, interior ventilation, etc. will be displayed on the display means, below or behind the array of opaque buttons. When the user selects a second mode, say, media mode, the display means displays a new collection of icons and/or text representing the media mode functions, thereby reconfiguring the array of opaque buttons.

In the context of this application the input key can alternatively made as an input button, input switch or any other input device which enables entering a predetermined set of information having preferably a tactile feedback. Same applies to the function switches.

In a preferred embodiment of the reconfigurable control device the opaque portion is overlaying the first section which displays text and/or graphic information representing the plurality of predetermined functions.

In a preferred embodiment of the reconfigurable control device, selecting the at least one input key initiates a command from the electronic control unit for retrieving information in relation to the plurality of predetermined modes. The at least one input key are mechanical components such as hardware buttons, capacitive buttons, switches and other suitable signaling devices that indicates an entry or input to an electric device such as that of an electronic control unit. It is preferred that an input or entry received by the electronic control unit will initiate a command to retrieve the programmable information from the electronic control unit. It will be appreciated such information can be pre-defined during designing stage, so as to predetermine the mode or function. The term "mode", "function", "function mode" shall collectively be construed to refer to an expression or a module that performs the task of computing received information, and returning a new piece of information based on input parameters.

In a preferred embodiment of the reconfigurable control device, the array of mechanical switches is reconfigured when a subsequent command from the electronic control unit for retrieving information in relation to the plurality of predetermined modes is received. When a second input such as the media mode is selected, the section or portion of the display means will show a new set of functions that are related to media mode, such as volume control, radio channels, selection of different alternative types of media, for instance play a video, play a compact disc, etc. will trigger a command from the electronic control unit, thereby reconfiguring the array of opaque switches displaying the icons and/or text representing the respective functions.

In a preferred embodiment of the reconfigurable control device, the array of mechanical switches receives a haptic feedback from the electronic control unit upon selection of a distinct function from the plurality of predetermined functions. The haptic or tactile feedback acts as a form of confirmation, for better user experience.

In a preferred embodiment of the reconfigurable control device, the plurality of the predetermined functions are displayed on the first section of the display means upon receiving the command from the electronic control unit for retrieving information in relation to the plurality of predetermined modes. When the user make a selection of the type of mode he or she wish to operate, the icon and/or text of the functions related to either climate mode or media, mode will be displayed on the section or portion of display means under the array of opaque switches. On this way only one display means or unit is needed in order to implement the reconfigurable buttons and the display of any other information, e.g. on the second display section, at the same time.

The advantage of having an active display means to reconfigure the function buttons or switches means that lesser hardware is involved in the design of the control device. This also means reduction in material costs. Since the representation of functions uses of only a portion display means, the other section or portion of the display means can be utilised for displaying other information. As only one display means is required, there is in an aspect of this invention, having a simple, cost efficient control device is achieved.

In a preferred embodiment of the reconfigurable control device, an end of each of the array of mechanical switches is configured to supply a catch for receiving a plunger, thereby forming a row of plungers aligned along the length of the electronic control unit. When an input is selected from the array of opaque switches or buttons, a plunger positioned below the opaque switch or button repositions towards the direction of the electronic control unit, to establish contact or communication. It will be appreciated a pin or the like is capable of performing the same.

In a preferred embodiment of the reconfigurable control device, each plunger from the row of plungers initiates a distinctive command from the electronic control unit for retrieving distinctive information in relation to each of the plurality of predetermined functions. When the plunger moves towards the electronic control unit, the plunger makes contact with a corresponding switch, such as a tact switch or any other types of switches capable of performing the same task, on the electronic control unit to provide a close loop. Each plunger is aligned to a corresponding tact switch programmed to perform a predetermined function. Therefore, when the plunger is in contact or communication with the plunger, the respective predetermined functions are initiated.

In a preferred embodiment of the reconfigurable control device the electronic control unit and the display means are aligned parallel to each other.

In a preferred embodiment of the reconfigurable control device the array of mechanical switches are arranged with respect to the first section of the display means 1 and the electronic control unit in that way that the opaque portion of the mechanical switches covers the first section of the display means and that the other portion of the array mechanical switches covers a portion of the electronic control unit.

In a preferred embodiment of the reconfigurable control device the lengths of the plunger is dimensioned in that way that the electronic control unit can be placed behind the display means allowing the electronic control unit to overlay the display unit partially.

In another aspect of the preferred embodiments, there is provided a method for reconfiguring a control device for use in vehicles, the device comprising a housing unit having a display means, an array of mechanical switches of an opaque material, and at least two input keys, the method comprising the steps of selecting a function mode by pressing one of the at least two input keys on the control device, next selecting a function displayed on the array of mechanical switches for selection of a desired function from a plurality of predetermined functions. The array of mechanical switches for selection of the desired function is reconfigured upon selecting the function mode by pressing one of the at least two input keys on the control device. Therefore, it will be appreciated that reconfiguration of the control device is realised by simply selecting the desired function mode.

BRIEF DESCRIPTION OF THE DRAWINGS

Other aspects of the invention will be described in detail in the following description of exemplary embodiments with reference to the accompany drawings in which.

DETAILED DESCRIPTION OF THE PREFERRED EMBODIMENTS

Hereinafter, an explanation of an aspect of the present invention will be discussed in detail.

Figure 1A:
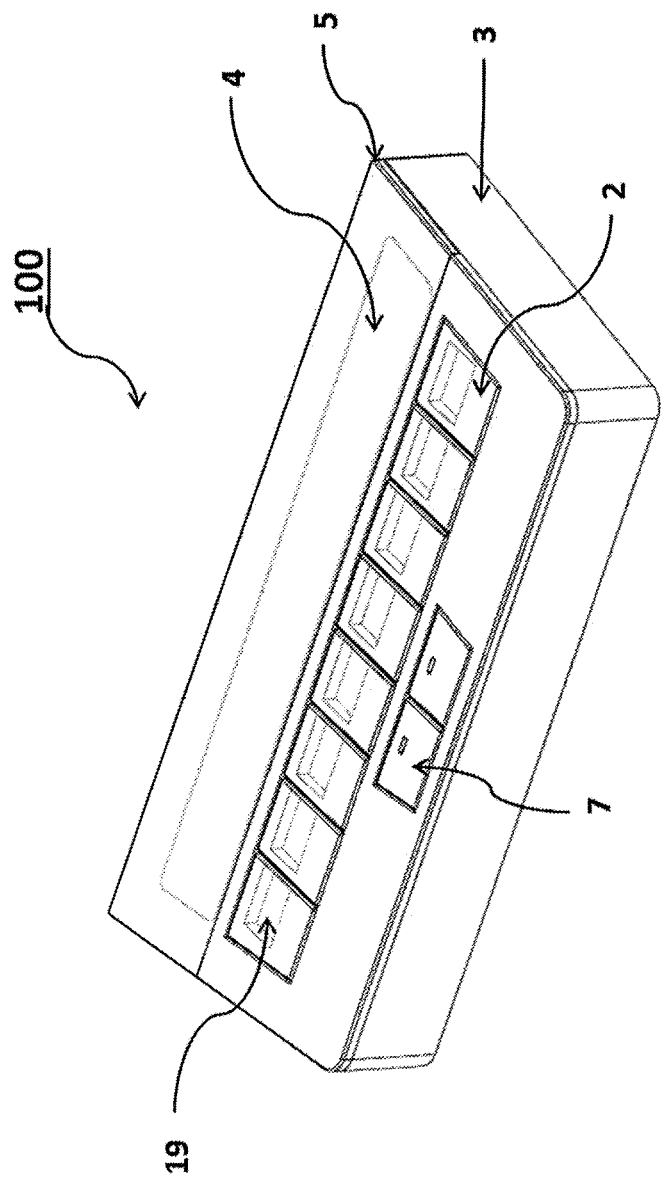
FIG. 1A shows a perspective view of a reconfigurable control device (100) in accordance with an aspect of the present invention.
Figure 1B:
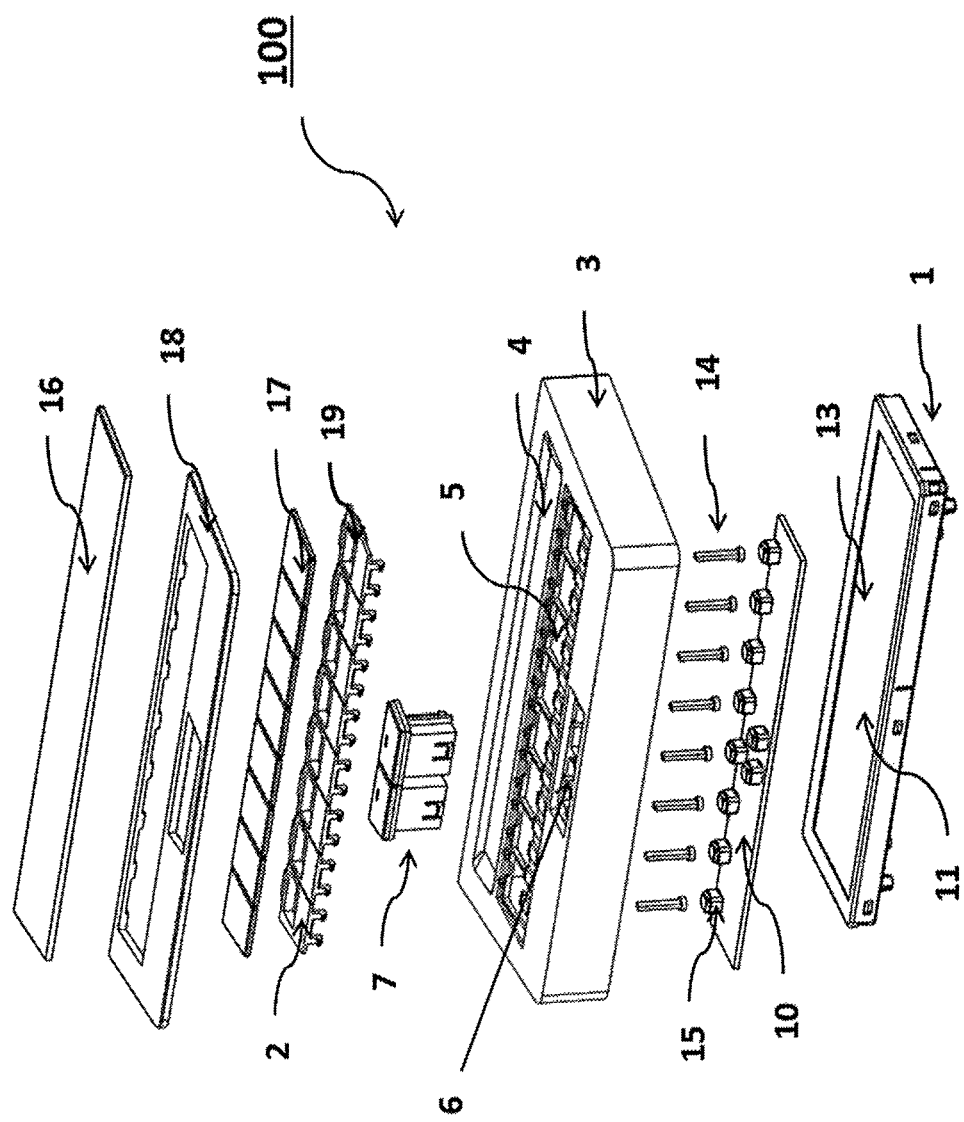
FIG. 1B shows an exploded view of the reconfigurable control device.

FIG. 1A shows a reconfigurable control device 100 in accordance to an aspect of the present invention and FIG. 1B shows an exploded view of the reconfigurable control device. The assembly of the reconfigurable control device 100 shown comprises of a display means 1 for supplying text and/or graphical information; an array of mechanical switches 2, the array of mechanical switches 2 overlaying a first section 11; a housing unit 3, the housing unit 3 having a display opening 4 for viewing a second section 13 of the display means 1; a recess 5 for receiving the array of mechanical switches 2; and at least two outlets 6, each of the at least two outlets for retaining at least one input key 7. The at least one input key 7 is configured for selecting a plurality of predetermined modes 8, and the array of mechanical switches 2 are each configured for supplying a plurality of predetermined functions 9.

Figure 2:
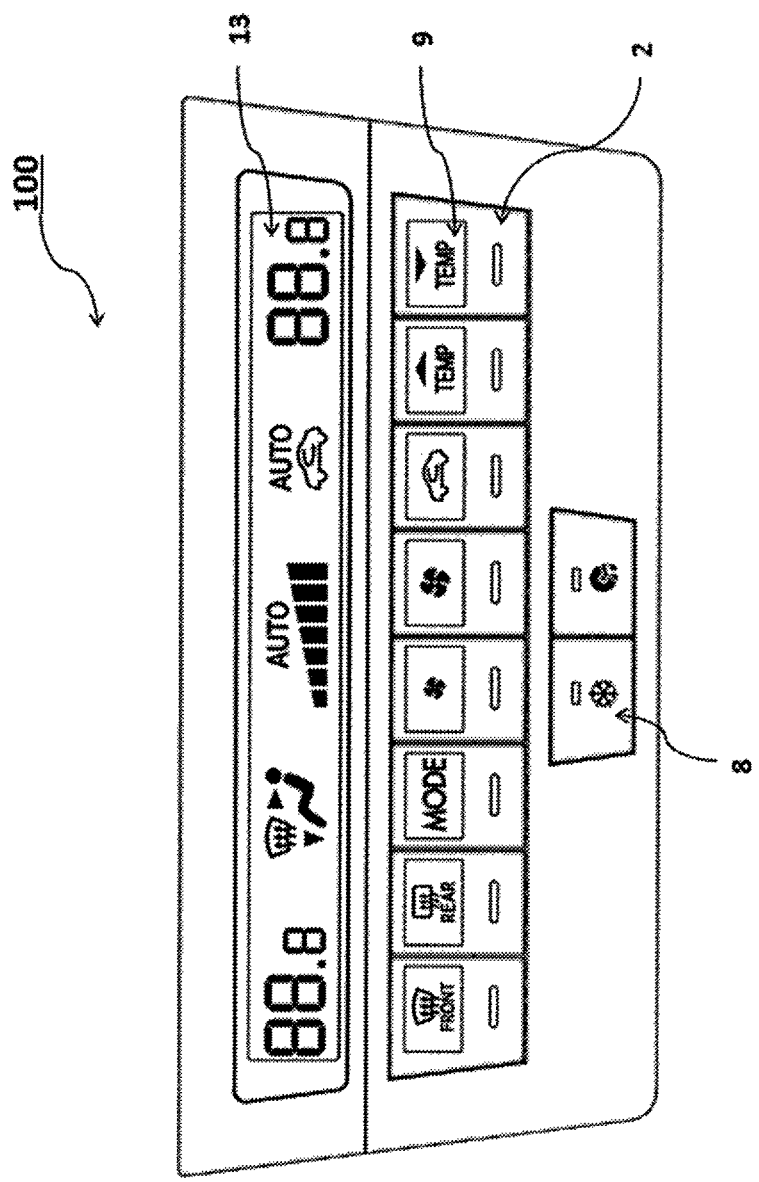
FIG. 2 illustrates the reconfigurable control device of an aspect of the present invention shown in a first function mode.
Figure 3:
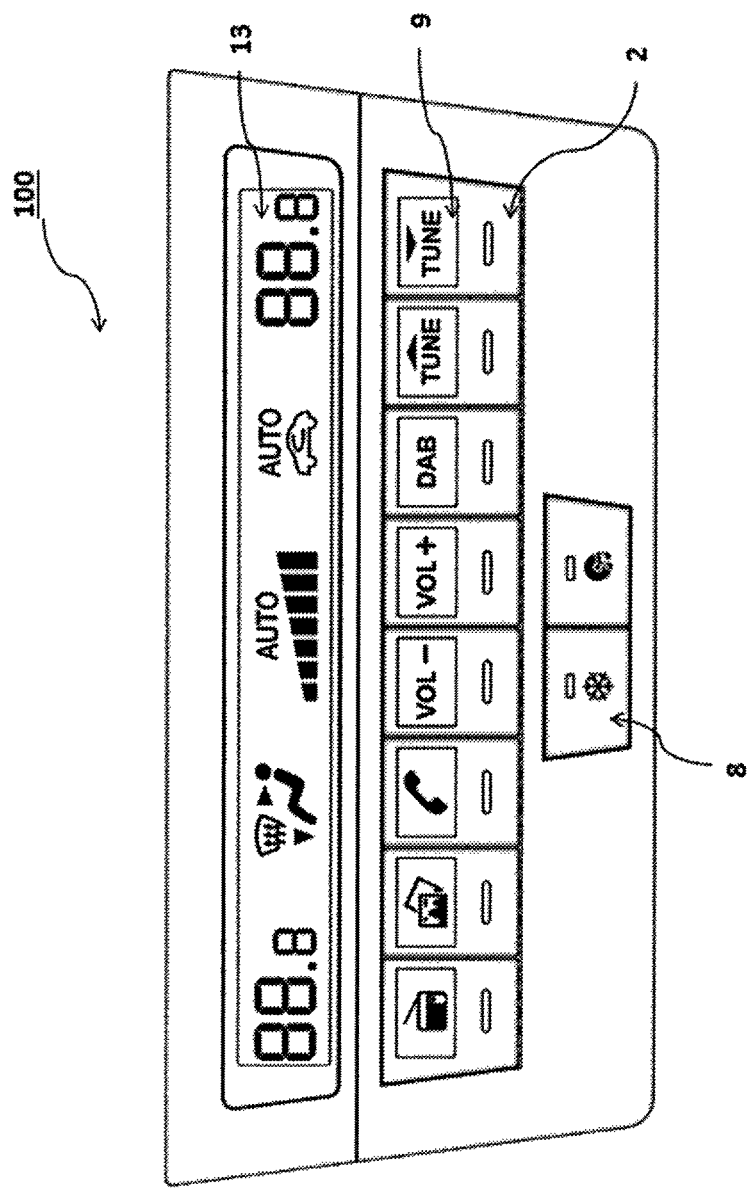
FIG. 3 illustrates the reconfigurable control device of an aspect of the present invention shown in a subsequent function mode.

Preferably, display means 1 is a thin film transistor liquid crystal display (TFT LCD) or Active Matrix organic light emitting diode (AMOLED). While it is preferred to use LCD or AMOLED as display means 1, it will be appreciated other types of display means 1 such as plasma is also suitable. The display means 1 is used to showcase graphical and/or text information. This can be predetermined parameters that do not require inter-switching function for selection by user. Such information may include for example, temperature inside the vehicle, temperature outside the vehicle, radio frequency mode, etc. as shown in the embodiment of FIG. 2 and FIG. 3.

An array of mechanical switches 2 having an opaque portion overlay a first section of the display means. This allows seeing or viewing the content of the first section of the display means on the mechanical switches 2 in order to redefine their function according to the predetermined functions 9. Preferably, the array of mechanical switches 2 comprises a recess 5 allowing seeing or viewing the portion of the first section 11 of the display means 1. The array of mechanical switches 2 are covered by a cover 17 which is made of opaque material, thereby allowing underlying information of the display means visible through the cover 17, or opaque portion 19 of the reconfigurable control device (as shown in FIG. 1A). Other types of materials that are transparent, clear or translucent will also produce the same effect. The array of mechanical switches 2 of opaque material operates like buttons. An end of the array of mechanical switches 2 is hinged to the recess 5 on a housing unit 3. A catch 12 clip, latch, hook, claps or the like is provided on the other end of each of the mechanical switches 2 for receiving, holding, grasping or latching a plunger 14, thereby forming a row of plungers. Preferably, the array of mechanical switches has a breadth greater than the breadth of the recess, thus forming a hood suspending above the electronic control unit.

The reconfigurable control device 100 has a housing unit 3. The housing unit 3 is used for housing different hardware components that makes up the control device 100. While housing unit made of any type of materials may be used, the housing unit 3 is typically made of plastic due to light weight, low cost and easily accessible. Besides housing the different hardware components, the housing unit 3 is also capable of keeping the hardware components from getting into contact with dirt, dust and moisture. Further casing or outer shell such as protective sheet 16 or covers 17 may be used to prevent direct contact of dirt, dust and moisture on other parts of the control device. Alternatively, decorative covers or casing 18 may be included for aesthetic reasons. A display opening 4 for viewing a second section 13 of the display means 1 is provided by the housing unit 3. A recess 5 for receiving the array of mechanical switches 2 and at least two outlets 6, each of the at least two outlets 6 for retaining at least one input key 7 is also provided.

As shown on FIG. 1B, the reconfigurable control device 100 has at least two outlets 6. These two outlets are supplied on the housing unit 3 for receiving at least one input key 7 in each of the at least two outlets 6. The input keys 7 can be in the form of buttons, such as a push button. It will be understood other types of signaling devices to initiate an input to an electric device may also be used. The input keys 7 are used for selecting a desired mode from a plurality of predetermined modes 8.

An electronic control unit 10, for example a printed circuit board (PCB) assembly is displaced adjacent to the display means 1. More specifically, a length of the electronic control unit 10 is parallel to a length of the display means 1. The electronic control unit 10 is programmed for retrieving information. The selected information is retrieved and displayed on an opaque portion of the array of mechanical switches 2 when the electronic control unit is in communication with the array of mechanical switches 2 and/or the at least one input key 7. When a selection is made using the input keys 7, a plurality of functions 9 are displayed on the first section of the display means 1. These icons and/or text will be shown on the first section of the display means or be seen displayed on the array of mechanical switches 2. Since the icons and/or text information will only be shown on the first section 11 or a portion or edge of the display means 1, the display means 1 can be fully utilise, and thus the object of reduction of materials costs is achieved. The plunger 14 provides a point of contact to communicate with the electronic control unit 10. The array of mechanical switches 2 are arranged with respect to the first section 11 of the display means 1 and the electronic control unit 10 that the opaque portion of the mechanical switches covers the first section of the display means and that the other portion of the mechanical switches covers a portion of the electronic control unit.

Ideally, the breadth of the electronic control unit 10 is configured to supply a row of switches 15 as shown in FIG. 1B. An example of such switches may be tact switches 15, embedded on a printed circuit board assembly. An advantage of using a tact switch is to enable a force drop haptic profile feedback. It will be appreciated that any other types of switches performing similar function may be used. The dimensions of the electronic control unit 10 are determined in that way that it can house the plungers for the row of switches 15 but leaves enough space for the display means to be placed behind or below the opaque portion of the switches 15. In that way the control device can be designed in a compact way.

FIG. 2 illustrates the reconfigurable control device 100 displaying the plurality of predetermined functions when a first mode, e.g. climate mode is selected.

When in use, selecting the at least one input key 7 initiates a command from an electronic control unit 10 for retrieving information in relation to the plurality of predetermined modes 8.

The array of mechanical switches 2 displays or represents a plurality of predetermined functions 9, which is shown on a first section 11 of the display means 1. As described above, the array of mechanical switches 2 has an opaque portion, thereby allowing the user or driver to see function icons or text displayed on the first section 11 of the display means 1. The plurality of the predetermined functions 9 is displayed on the first section 11 of the display means 1 upon receiving a command from the electronic control unit 10 for retrieving information in relation to the selection of predetermined modes 8. The assembly of the reconfigurable control device 100 is such that each plunger 14 from the row of plungers initiates a distinctive command from the electronic control unit 10 for retrieving distinctive information in relation to each of the plurality of predetermined functions 9. As such, when a subsequent selection of a desired or distinctive function using the array of mechanical switches 2 is complete, the plunger 14 positioned below each of the array of mechanical switches 2 shifts and reposition to make contact or communicate with the corresponding tact switch 15 on the electronic control unit 10, thereby forming a close loop, initiating a distinctive command from the electronic control unit 10 to retrieve desired or distinctive information from the plurality of predetermined functions 9 based upon selection.

FIG. 3 illustrates the reconfigurable control device 100 displaying the plurality of predetermined functions 9 when a subsequent function mode 8, such as a media mode is selected.

The array of mechanical switches 2 is reconfigured when a subsequent command from the electronic control unit 10 for retrieving information in relation to the plurality of predetermined modes 8 is received. The subsequent command is initiated when a different input key 7 is selected. The array of mechanical switches 2 for selection of the desired function is reconfigured upon selecting the plurality of predetermined mode 8 by pressing one of the at least two input keys 7 on the control device 100. When selection of a second or subsequent desired or distinctive function using the array of mechanical switches is complete, the plunger positioned below each of the array of mechanical switches reposition to make contact or communicate with the corresponding tact switch 15 on the electronic control unit 10. A distinctive command from the electronic control unit 10 to retrieve desired or distinctive information from the plurality of predetermined functions 9 based upon selection.

Figure 4A:
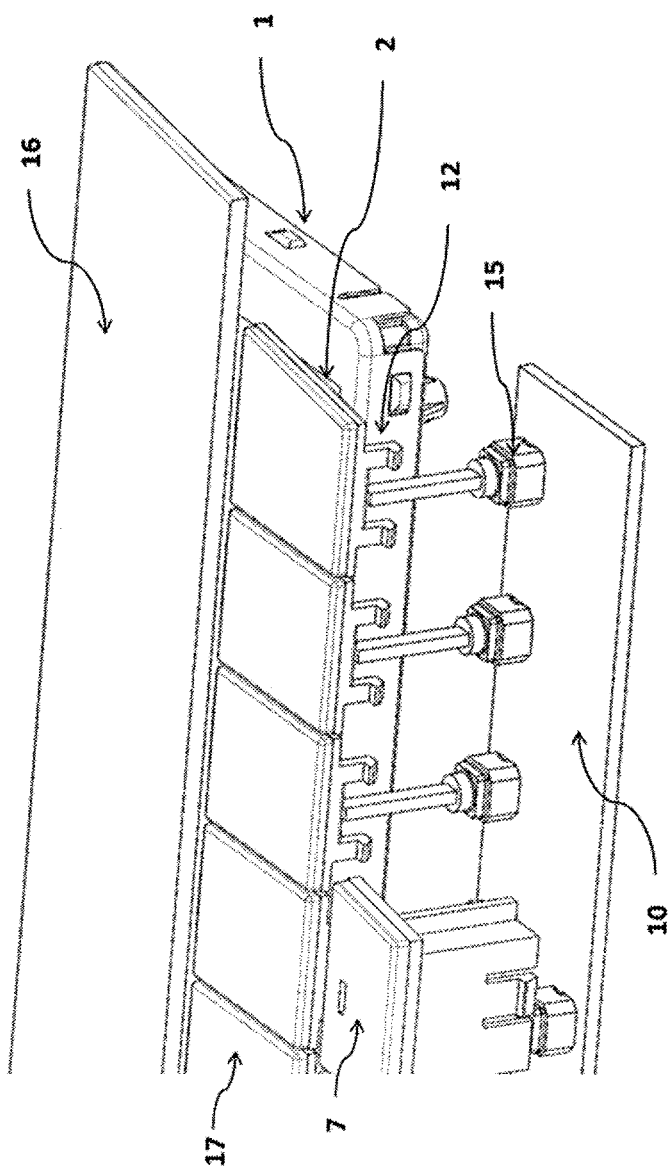
FIG. 4A illustrates a perspective view of the mechanisms of an array of mechanical switches of the reconfigurable control device in accordance with an aspect of the present invention.
Figure 4B:
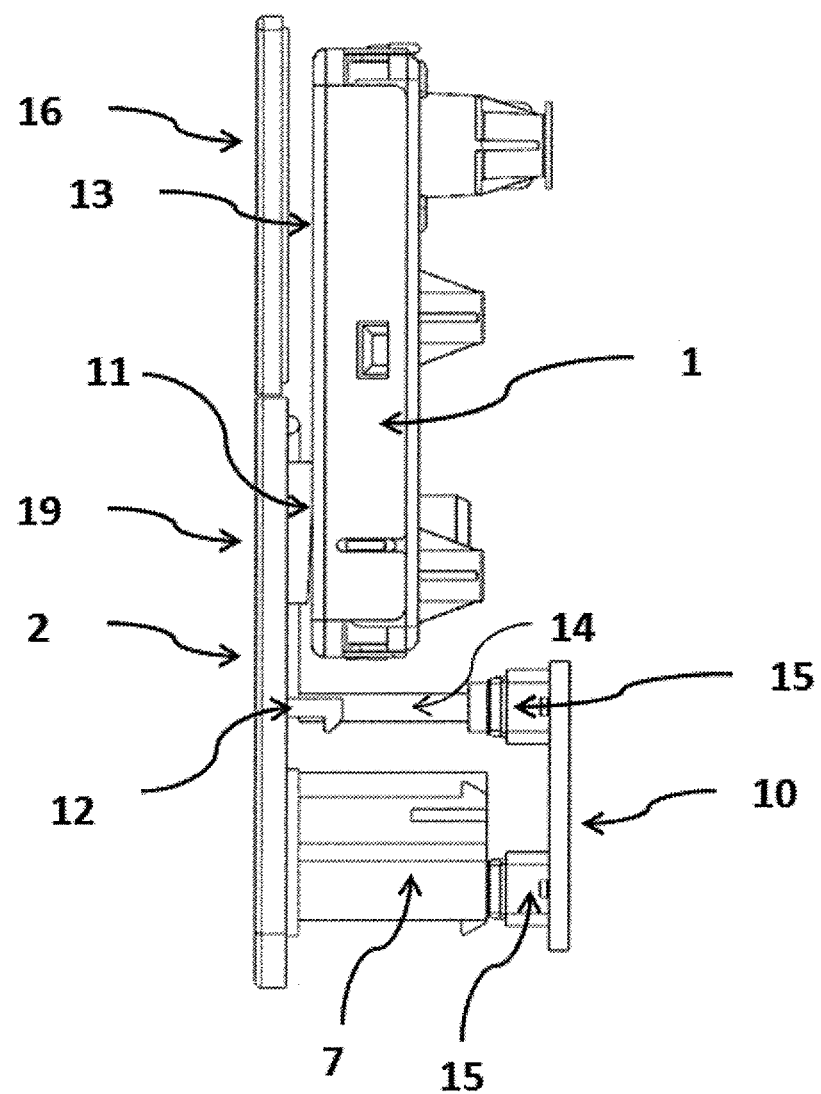
FIG. 4B illustrates a side view of the mechanisms of an array of mechanical switches of the reconfigurable control device in accordance with an aspect of the present invention.

FIG. 4A illustrates a perspective view of the mechanisms of an array of mechanical switches 2 of the reconfigurable control device 100 in accordance with an aspect of the present invention, while FIG. 4B shows a side view of the same. With reference to FIG. 4B, the electronic control unit 10, for example a PCB assembly, is displaced adjacent to the display means 1. The electronic control unit 10 and the display means 1 are aligned parallel to each other. The lengths of the plunger 14 is dimensioned in that way that the electronic control unit 10 can be placed behind the display means 1 allowing the electronic control unit 10 to overlay the display unit partially. As the plunger has a small diameter the array or mechanical switches 2 only need to extend slightly over the display means 1. That allows fabricating the reconfigurable control device 100 in a thin and compact manner. An opaque portion of the mechanical switches 2 overlays the first section 11 of the display means 1 such that the text and/or graphic information representing the plurality of functions 9 is displayed when each of the at least one input key 7 is selected.

In any of the above discussed embodiments, the array of mechanical switches 2 receives a haptic feedback from the electronic control unit 10 upon selection of a distinct function from the plurality of predetermined functions 9. This serves as a confirmation to ensure that a function has been activated.

In an alternative aspect of the embodiment, the control device 100 is reconfigured by performing a first step of selecting a function mode 8 by pressing one of the at least two input keys 7 on the control device and a second step of selecting a function 8 displayed on the array of mechanical switches 2 for selection of a desired function from a plurality of predetermined functions 9. Selection of the desired function is done using the array of mechanical switches 2. The mechanical switches 2 is reconfigured when one of the at least two input keys 7 is selected, thereby sending a fresh input, selection or signal to initiate a command from the electronic control unit 10.

The invention claimed is:

1. A reconfigurable control device, for use in vehicles, comprising:
    a display for supplying text and/or graphic information;
    an array of mechanical switches,
    a housing unit, a surface of the housing unit comprising:
    a display opening for viewing a second section of the display;
    a recess for receiving the array of mechanical switches;
    at least two outlets, each of the at least two outlets for retaining at least one input key; and
    an electronic control unit comprising a plurality of switches for receiving information from the array of mechanical switches and the input keys, wherein the at least one input key is configured for selecting a plurality of predetermined modes, and the array of mechanical switches are each configured for supplying a plurality of predetermined functions, and
    wherein the array of mechanical switches partially covers a first section of the display and the electronic control unit, and
    each of the mechanical switches has at least a portion formed by a material which allows underlying information of the display to be visible through the respective mechanical switch,
    wherein the array of mechanical switches are arranged with respect to the first section of the display and the electronic control unit in such a way that the portion of each mechanical switch formed by the material which allows underlying information of the display to be visible covers the first section of the display and another portion of each mechanical switch covers a section of the electronic control unit, and wherein each of the array of mechanical switches is coupled to a respective one of an array of plungers, each of the plungers configured to press a corresponding one of the plurality of switches of the electronic control unit, and wherein a length of the plunger is selected such that the display is positioned closer to the array of mechanical switches than the electronic control unit, and the electronic control unit at least partially overlays the display.

2. The reconfigurable control device of claim 1, wherein the portion overlays the first section which displays text and/or graphic information represents the plurality of predetermined functions.

3. The reconfigurable control device of claim 1, wherein selecting the at least one input key initiates a command from the electronic control unit for retrieving information in relation to the plurality of predetermined modes.

4. The reconfigurable control device of claim 1, wherein the array of mechanical switches is reconfigured when a subsequent command from the electronic control unit for retrieving information in relation to the plurality of predetermined modes is received.

5. The reconfigurable control device of claim 1, wherein the array of mechanical switches receives a haptic feedback from the plurality of switches of the electronic control unit upon selection of a distinct function from the plurality of predetermined functions.

6. The reconfigurable control device of claim 1, wherein the plurality of the predetermined functions is displayed on the first section of the display upon receiving the command from the electronic control unit for retrieving information in relation to the plurality of predetermined modes.

7. The reconfigurable control device of claim 1, wherein each plunger from the row of plungers initiates a distinctive command from the electronic control unit for retrieving distinctive information in relation to each of the plurality of predetermined functions.

8. The reconfigurable control device of claim 1, wherein, the electronic control unit and the display are aligned parallel to each other.

9. The reconfigurable control device of claim 2, wherein selecting the at least one input key initiates a command from the electronic control unit for retrieving information in relation to the plurality of predetermined modes.

10. A method for reconfiguring a control device, for use in vehicles, wherein the control device comprises:

a housing unit having a display;

an array of mechanical switches, each of the mechanical switches having at least a portion formed by a material which allows underlying information of the display to be visible through the respective mechanical switch, each of the array of mechanical switches being coupled to a respective one of an array of plungers, each of the plungers configured to press a corresponding one of a plurality of switches of an electronic control unit; and at least two input keys, wherein the array of mechanical switches are arranged with respect to the display in such a way that the portion of each mechanical switch formed by the material which allows underlying information of the display to be visible covers a first section of the display and another portion of each mechanical switch does not cover any portion of the display, wherein a length of the plunger is selected such that the display is positioned closer to the array of mechanical switches than the electronic control unit, and the electronic control unit at least partially overlays the display;

the method comprising:

selecting a function mode by pressing one of the at least two input keys on the control device;

selecting a function displayed on the array of mechanical switches for selection of a desired function from a plurality of predetermined functions, and reconfiguring the array of mechanical switches for selection of the desired function upon selecting the function mode by pressing one of the at least two input keys on the control device.

\* \* \* \* \*